UNITED STATES PATENT OFFICE.

ARON HAMBURGER, OF MAYFAIR, LONDON, ENGLAND.

COLOR PHOTOGRAPHY.

1,308,708. Specification of Letters Patent. Patented July 1, 1919.

Application filed January 20, 1919. Serial No. 272,201.

*To all whom it may concern:*

Be it known that I, ARON HAMBURGER, a citizen of the United States of America, and residing at 38 Dover street, Mayfair, London, W. 1, England, have invented certain new and useful Improvements Relating to Color Photography, of which the following is a specification.

This invention relates to the preparation of photographic reproductions of objects in natural colors, and to apparatus therefor.

The invention embraces a multi-color process in which complementary color negatives say a red or orange red value negative and a blue or blue green value negative, one of which is reversed, are accurately superimposed, on opposite sides of a doubly sensitized film and photochemically printed. The combined positive is then bleached and dyed or pigmented in separate or simultaneous operations each side its respective color, and may itself be used as a finished two-color photograph or it may be combined after clearing with a yellow value positive prepared preferably by the process of my British Patent No. 20,880, September 21, 1911, according to which mercury-silver iodid gives the yellow color.

The invention also embraces a method of and means for dyeing the two sides of the positive without risk of staining either side by the reagents used on the other.

The invention further provides a dyeing frame adapted for simultaneous dyeing of both sides of the positive.

In carrying this invention into effect in one form, I prepare a red value negative and a blue value negative of the colored object to be reproduced by photographing through color screens by means of a camera in the usual way. If these negatives are prepared with an ordinary camera, then I reverse one of the negatives. I prefer, however, to employ a camera embodying the invention described in British patent to Conrady and Hamburger No. 28,722, December 13, 1912, (corresponding to U. S. patent to Conrady et al., 1,140,576, May 25, 1915), *i. e.*, a type of camera with which both negatives can be produced at the same time, one of them being reversed. These negatives represent the red value of the object and the blue value of the object respectively and should be practically complementary. I superimpose these negatives accurately in relation to one another upon opposite sides of a doubly sensitized film, *i. e.*, a film having emulsion on both sides. I then print through each of these negatives by suitable simultaneous illumination from opposite sides and develop and fix as usual. When the negatives are truly complementary and of practically the same density I find that no protective screening is required if equal illuminations be used and that the color values print without interference with one another. I then bleach the double positive, say by the well-known Traube method. The object of this process is to convert the silver image into a silver salt which has a high affinity for coal tar colors.

In order to obtain an image more stable and resistant to washing, &c., I prefer to employ a bleaching solution made up as follows:—2 fluid ozs. of a solution of 1 oz. of potassium iodid in 9 ozs. of water are added slowly and with stirring to 4 fluid ozs. of a solution of 1 oz. of potassium bichromate and 9 ozs. of water. To the resulting solution is added very slowly and with stirring 16 fluid ozs. of water containing 80 minims hydrochloric acid. The developed and fixed film which is to be colored is soaked in cold water and allowed to drain. It is then introduced into the bleaching bath, until the silver in the image is completely bleached. It is then thoroughly washed in cold water, and then in warm water up to 140° F., until all reddish and yellowish stains disappear, and the non-silver spaces are thoroughly colorless and clear. The positive is then ready for dyeing. The positive thus produced is then placed in a dyeing frame as shown in the accompanying drawings:

Referring to the accompanying drawings:—

Figure 1:
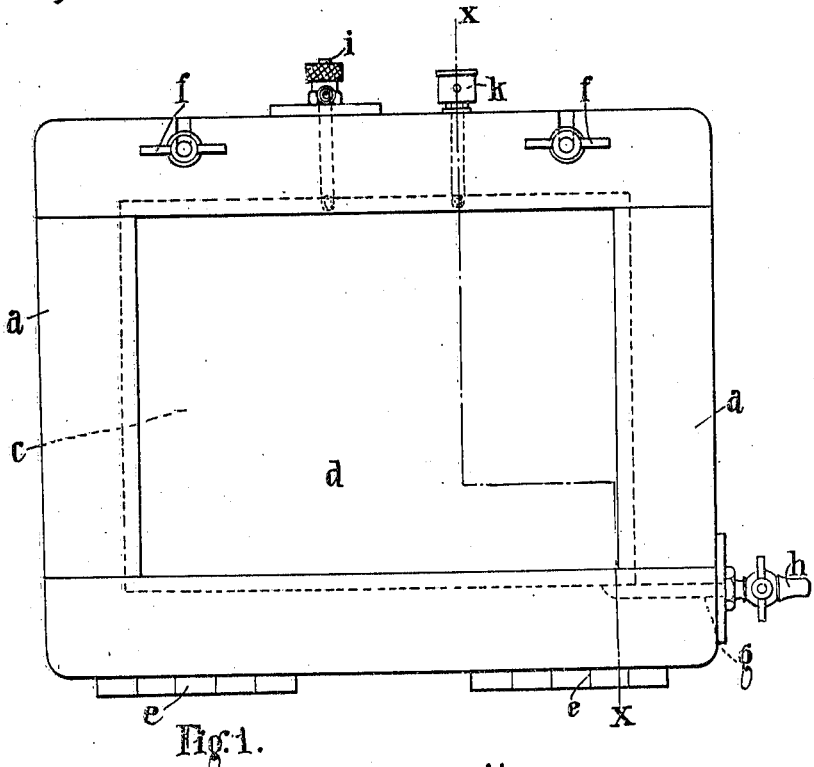
Figure 1 is a side elevation of a dyeing frame constructed according to my invention.
Figure 2:
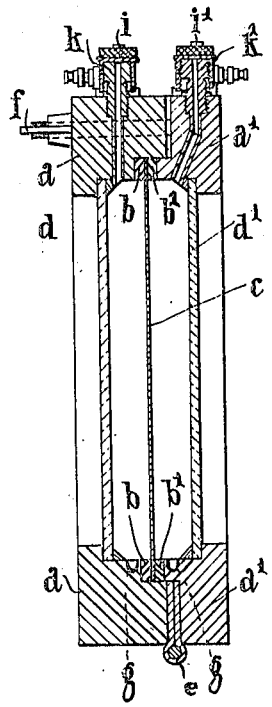
Fig. 2 is a sectional elevation on line X—X of Fig. 1.

Two rectangular frames *a a'* of a suitable size for the positive film to be treated are constructed similar to printing frames, but the one is adapted to fit into the rabbet of the other, just as if it were the glass of an ordinary printing frame. The rabbet of the one frame is provided with rubber *b* or like jointing material, so that the film *c* when pressed against it around the edges will be sealed with a water-tight joint. The second half of the frame is also provided with a ring of jointing material b', and is placed on the top of the film, clamping the latter against the other half frame all around its edges in a water-tight manner. The outer side of each of the halves of the frame is provided with a sheet of glass d d' sealing against the edges of the frames and thus forming a tank chamber on each side of the film. The two halves of the frame may be arranged for rapid opening and closing by means of hinges e along the bottom edge and wing nuts and screws f on the top edge. The tank chambers on each side of the film are provided with outlet passages g at their lower ends, and these are controlled by suitable cocks or valves h. Inlets i i' are provided at the top edges of the tank chambers, for the admission of the dyeing fluids. Means are also provided for the outlet of air by the valves k k' as the fluid is introduced. The air exit valves k k' may be adapted to be closed at will. To prevent sagging of the film, the two fluids may be introduced simultaneously.

The film introduced into the dyeing tank just described, and clamped therein, is dyed by the introduction of the appropriate dyeing fluids on each side. The film may thus be simultaneously dyed on both sides. The dyeing fluids are then run off and the positive thoroughly washed, until all the non-silver parts are cleared of dye. Fixing is then effected in a solution of sodium thiosulfate ("hypo") containing 5 per cent. of tannic acid, and the film is then washed and dried in the ordinary way.

The positive film thus obtained is then combined by superposition with a yellow tone positive representing the yellow color value of the object photographed. Where a two-color result only is desired, a positive similarly made from orange red and blue green value negatives and dyed relatively blue green and orange red, may be mounted on paper or used as a transparency. The yellow positive is preferably obtained by the use of mercury-silver iodid, as the pigment, as described in my aforesaid British Patent No. 20880 of 1911, and the combination gives a practically perfect color reproduction of the original object in natural colors.

In carrying this invention into effect in another form, instead of separately bleaching and dyeing the positive images printed on the film from complementary color negatives, I may simultaneously effect both operations by taking carbon papers or dye gelatin papers containing the desired colors and soaking them for five minutes in a bleaching and pigmenting solution as described below, and thus the silver images are converted into dyed or pigmented images. The papers or the like thus soaked are pressed into contact with the two sides of the film on which the required positive complementary color images have been printed. They are thus allowed to remain in contact a suitable time say 20 to 25 minutes. Then the carbon paper is developed in hot water as usual or the dye paper washed only in cold water. Simultaneous bleaching and pigmenting or dyeing is thus effected.

The required solution is prepared from the following ingredients:—

Copper sulfate_____ 4 ozs.
Potassium bromid_____ 1400 grs.
Potassium bichromate___ 180 grs.
HCl_____ 80 minims.

The copper sulfate is dissolved with the potassium bromid in 20 ozs. of water and the potassium bichromate in another equal quantity of water to which the HCl is also added. The two solutions are then mixed slowly while stirring well and the resulting solution is ready for use. The dyes required are for greenish blue basic methylene blue which should be nearly as possible minus red and for magenta red basic fuchsin red which should be as nearly as possible minus green.

The apparatus herewith described is not claimed in the present application, but forms the subject matter of a divisional application Serial No. 298,527, filed by me May 20, 1919.

Having now described my invention what I claim as new and desire to secure by Letters Patent is:—

1. A multi-color process comprising accurately registering and photo-chemically printing complementary color-value negatives, one of which is reversed, respectively upon both sides of a positive film sensitized on both sides, and thereafter while maintaining the said positive in a vertical position between two dissimilar liquids in contact therewith, but not in contact with each other, practically simultaneously developing the respective colors on the two sides of the combined positive so produced.

2. A multi-color process comprising accurately registering and photo-chemically printing complementary color-value negatives, one of which is reversed, respectively upon both sides of a positive film sensitized on both sides, and thereafter while maintaining the said positive in a position between two dissimilar liquids in contact therewith, but not in contact with each other, practically simultaneously developing the respective colors in the two sides of the combined positive so produced, and combining therewith a yellow value positive.

3. A multi-color process comprising accurately registering and photo-chemically printing complementary color-value negatives, one having a red to orange-red value and the other having a blue to blue-green value, one of which negatives is reversed, respectively upon opposite sides of a positive film sensitized on both sides and practically simultaneously coloring the combined positive so produced on each side with its respective color, the combined positive being so framed as to form tanks for dyeing, one wall of each being formed by the film itself.

In testimony whereof I have signed my name to this specification.

ARON HAMBURGER.